(12) United States Patent
Wang et al.

(10) Patent No.: US 12,717,099 B2
(45) Date of Patent: Aug. 25, 2026

(54) BI-DIRECTION OPTICAL SUBASSEMBLY, COMBO OPTICAL MODULE, AND OPTICAL NETWORK DEVICE

(71) Applicant: POTRON TECHNOLOGY CO., LTD., Shenzhen (CN)

(72) Inventors: Qiao Wang, Shenzhen (CN); Biao Zhao, Shenzhen (CN); Sijun Wang, Shenzhen (CN); Mingpeng Sun, Shenzhen (CN); Yunsheng Deng, Shenzhen (CN)

(73) Assignee: POTRON TECHNOLOGY CO., LTD., Shenzhen (CN)

( * ) Notice: Subject to any disclaimer, the term of this patent is extended or adjusted under 35 U.S.C. 154(b) by 382 days.

(21) Appl. No.: 18/310,551

(22) Filed: May 2, 2023

(65) Prior Publication Data

US 2024/0288640 A1 Aug. 29, 2024

(30) Foreign Application Priority Data

Feb. 23, 2023 (CN) ......................... 202310157739.2

(51) Int. Cl.
*H04B 10/00* (2013.01)
*G02B 6/42* (2006.01)
*H04B 10/40* (2013.01)

(52) U.S. Cl.
CPC ......... *G02B 6/4246* (2013.01); *G02B 6/4206* (2013.01); *G02B 6/4281* (2013.01); *H04B 10/40* (2013.01)

(58) Field of Classification Search
CPC .. G02B 6/4246; G02B 6/4206; G02B 6/4281; G02B 6/4215; H04B 10/40
See application file for complete search history.

(56) References Cited

U.S. PATENT DOCUMENTS

2023/0026205 A1 1/2023 Ge et al.
2024/0288640 A1* 8/2024 Wang .................. G02B 6/4246

FOREIGN PATENT DOCUMENTS

CN 201413414 Y 2/2010
CN 108776374 A 11/2018
CN 110417476 A 11/2019
CN 115508954 A 12/2022
WO 2022083366 A1 4/2022
WO WO-2023119216 A1 * 6/2023 ........... G02B 6/4292

* cited by examiner

*Primary Examiner* — Agustin Bello

(57) ABSTRACT

A bi-direction optical subassembly, a combo optical module and an optical network device are provided. The bi-direction optical subassembly includes a first transmitter, a second transmitter, a first receiver, and a second receiver. A first optical transmission port, a second optical transmission port, a first optical reception port, and a second optical reception port are encapsulated in the main body. The first optical transmission port and the first optical reception port are arranged on a same side of the main body, which optimizes a structural layout and reduces the number of flexible circuit boards.

11 Claims, 3 Drawing Sheets

BI-DIRECTION OPTICAL SUBASSEMBLY, COMBO OPTICAL MODULE, AND OPTICAL NETWORK DEVICE

TECHINICAL FIELD

The subject matter herein generally relates to an optical communication technology field, especially in relate to a bi-direction optical subassembly, a combo optical module, and an optical network device.

BACKGROUND

An Optical Network Unit (ONU) is mainly used to selectively receive a broadcast sent by an Optical Line Terminal (OLT), and collects and caches Ethernet data sent by a user. Generally, the ONU is equipped with a Bi-direction Optical Subassembly (BOSA), and the BOSA receives service data by an optical fiber and the service data is transmitted by the OLT, and the BOSA provides various broadband services to the user.

A Passive Optical Network (PON) is one of the best candidate networks for a next-generation access network. The PON adopts a single-fiber bidirectional optical access network with a point-to-multipoint structure. The PON is composed of the OLT, an Optical Distribution Network (ODN) set on a network side and the ONU set on user side. Due to a large bandwidth of the optical fiber, the PON can simultaneously adapt to broadband voice services, data services and video services. Currently, large-scale deployed PONs includes an Ethernet Passive Optical Network (EPON) and a Gig-bit Passive Optical Network (GPON). With an upgrade of a network bandwidth, the next generation network to be deployed is a 10 G-EPON and a 10 G-GPON. In order to solve a coexistence problem of the EPON, the GPON, the 10 G-EPON and the 10 G-GPON, taking the GPON as an example, the OLT can combine and multiplex uplink wavelengths and downlink wavelengths of the GPON and the 10 G-GPON by a built-in Wavelength Division Multiplexing (WDM) device (for example, multiplexer or demultiplexer), to combine a GPON optical module and a 10 G-GPON optical module into one, and get a Combo Optical Module.

As shown in FIG. 1, a four-port Bi-direction Optical Subassembly Quad-OSA used in the Combo ONU in a related art, integrates two sets of the Bi-direction Optical Subassembly, namely a first transmitter 1, a first receiver 3, a second transmitter 2 and a second receiver 4. The Quad-OSA couples to output optical ports by using a WDM device. Since the first transmitter 1 and the first receiver 3 are arranged crosswise, or the second transmitter 2 and the second receiver 4 are arranged crosswise, a connection circuit path between the Quad-OSA and a driver chip of the Quad-OSA become longer, and three or four flexible circuit boards are needed to complete the connection circuit path, thus not only making a circuit and an assembly process of the Quad-OSA complicated, but also increasing a signal loss and an electromagnetic interference, and having a poorer high frequency performance.

SUMMARY

A purpose of the present disclosure is to provide a bi-direction optical subassembly, a combo optical module, and an optical network device. The present disclosure can optimize a structural layout, reduce the number of flexible circuit boards, simplify a wiring process of high-speed chip drive circuits, reduce an overall cost, and improve a product performance.

In a first aspect, one embodiment of the present disclosure provides a bi-direction optical subassembly including a main body, a first transmitter, a second transmitter, a first receiver, and a second receiver. The main body includes an optical transmission channel, a first optical transmission port, a second optical transmission port, a first optical reception port, a second optical reception port, and an optical fiber connection port. The first optical transmission port, the second optical transmission port, the first optical reception port, the second optical reception port and the optical fiber connection port are connected to the optical transmission channel. The first transmitter is encapsulated in the first optical transmission port, and configured to generate a first optical signal with a first wavelength, the second transmitter is encapsulated in the second optical transmission port, and configured to generate a second optical signal with a second wavelength, and a transmission rate of the first optical signal is greater than a transmission rate of the second optical signal. The first receiver is encapsulated in the first optical reception port, and configured to receive a third optical signal with a third wavelength, the second receiver is encapsulated in the second optical transmission port, and configured to receive a fourth optical signal with a fourth wavelength. The first optical transmission port and the first optical reception port are arranged on a same side of the main body, the second optical transmission port is arranged opposite to the optical fiber connection port, the second optical reception port is opposite to the first optical reception port, and the second optical reception port is staggered with the first optical reception port.

In one embodiment, the optical transmission channel includes a first optical channel connected between the second transmitter and the optical fiber connection port, a second optical channel connected between the first transmitter and the first optical channel, a third optical channel connected between the first receiver and the first optical channel, and a fourth optical channel connected between the second receiver and the first optical channel. The bi-direction optical subassembly further includes a first filter, a second filter, a third filter, a fourth filter, and a fifth filter, the first filter is arranged at an intersection between the first optical channel and the second optical channel. The second filter is arranged at an intersection between the first optical channel and the fourth optical channel, the third filter is arranged at an intersection between the first optical channel and the third optical channel, and the second filter is perpendicular to the third filter. The fourth filter is arranged at the third optical channel, and the fifth filter is arranged at the fourth optical channel, and a position of the fifth filter is opposite to positions of the second filter and the third filter.

In one embodiment, an included angle between a normal of the first filter and an optical axis of the first optical channel, an included angle between a normal of the second filter and the optical axis of the first optical channel, and an included angle between a normal of the third filter and the optical axis of the first optical channel are all 45°; an included angle between a normal of the fourth filter and an optical axis of the third optical channel is 0°, and an included angle between a normal of the fifth filter and an optical axis of the fourth optical channel is 0°.

In one embodiment, the bi-direction optical subassembly further includes a base part, an isolator, and a lens. The base part is embedded in the main body, the lens and the isolator are sequentially arranged between the first filter and the third filter in the first optical channel, and the lens and the isolator are respectively connected to the base part, the lens is configured to collimate an emission beam transmitted from the first filter, and the isolator is configured to transmit the emission beam transmitted from the lens.

In one embodiment, the first wavelength is 1270 nm, the second wavelength is 1310 nm, the third wavelength is 1577 nm, and the fourth wavelength is 1490 nm.

In a second aspect, one embodiment of the present disclosure provides a combo optical module including a housing. Any one of the above bi-direction optical subassembly arranged in the housing. A circuit board arranged in the housing, and the bi-direction optical subassembly is electrically connected to the circuit board.

In one embodiment, the circuit board includes a rigid printed circuit board and a flexible circuit board, the first receiver and the first transmitter are electrically connected to the rigid printed circuit board by the flexible circuit board, the second transmitter, and the second receiver are respectively electrically connected to the rigid printed circuit board by bent pins; or the first receiver is electrically connected to the rigid printed circuit board by the flexible circuit board, and the first transmitter, the second transmitter, and the second receiver are respectively electrically connected to the rigid printed circuit board by the bent pins.

In one embodiment, the circuit board includes a rigid printed circuit board and a flexible circuit board, the first receiver is electrically connected to the rigid printed circuit board by the flexible circuit board. The first transmitter, the second transmitter, and the second receiver are electrically connected to the rigid printed circuit board by straight pins respectively; or the first transmitter is electrically connected to the rigid printed circuit board by bent pins. The second transmitter and the second receiver are electrically connected to the rigid printed circuit board by the straight pins respectively.

In a third aspect, one embodiment of the present disclosure provides an optical network device including any above combo optical module.

In one embodiment, the optical network device further includes an optical line terminal (OLT) or an optical network unit (ONU).

The present disclosure relates to a bi-direction optical subassembly, a combo optical module and an optical network device. The bi-direction optical subassembly includes a main body, and the main body defines a first transmitter, a second transmitter, a first receiver and a second receiver. A transmission rate of a first optical signal generated by the first transmitter is greater than a transmission rate of a second optical signal generated by the second transmitter. By setting the first transmitter and the first receiver on a same side of the main body, the first transmitter and the first receiver can share one flexible circuit board. Simultaneously, the second transmitter is arranged opposite to the optical fiber connection port, and the second receiver is opposite to the first receiver and the second receiver is staggered with the first receiver. Therefore, the present disclosure can optimize a structural layout, compared with a cross arrangement of the first transmitter and the first receiver or the second transmitter and the second receiver in the related art, the present disclosure can greatly reduce the number of flexible circuit boards, simplify the wiring process of high-speed chip drive circuits, and reduce an overall cost, and improve a product performance.

BRIEF DESCRIPTION OF THE DRAWINGS

In order to more clearly illustrate technical solutions in the embodiments of the present disclosure, the following description will briefly introduce the drawings that need to be used in the embodiments or the prior art. Obviously, the drawings in the following description are some embodiments of the present disclosure. For those of ordinary skill in the art, on a premise of not paying creative work, other drawings can also be obtained according to these drawings. In addition, in the drawings, the same reference numerals are used for the same components, and the drawings are not drawn to actual scale.

REFERENCE NUMBER

1: first transmitter; 2: second transmitter; 3: first receiver; 4: second receiver; 5: main body; L1: first optical channel; L2: second optical channel; L3: third optical channel; L4: fourth optical channel; 51: first optical transmission port; 52: second optical transmission port; 53: first optical reception port; 54: second optical reception port; 55: optical fiber connection port; 61: first filter; 62: second filter; 63: third filter; 64: fourth filter; 65: fifth filter; 7: base part; 8: lens; 9: isolator; 10: optical fiber; 100: flexible circuit board; 200: rigid printed circuit board.

DETAILED DESCRIPTION

In order to make purposes, technical solutions and advantages of the present disclosure clearer, technical solutions of the present disclosure will be clearly and completely described in conjunction with the accompanying drawings in the embodiments of the present disclosure. Obviously, described embodiments are part of the embodiments of the present disclosure, but not all embodiments. Based on the embodiments of the present disclosure, all other embodiments obtained by persons of ordinary skill in the art without making creative efforts belong to a protection scope of the present disclosure.

Figure 1:
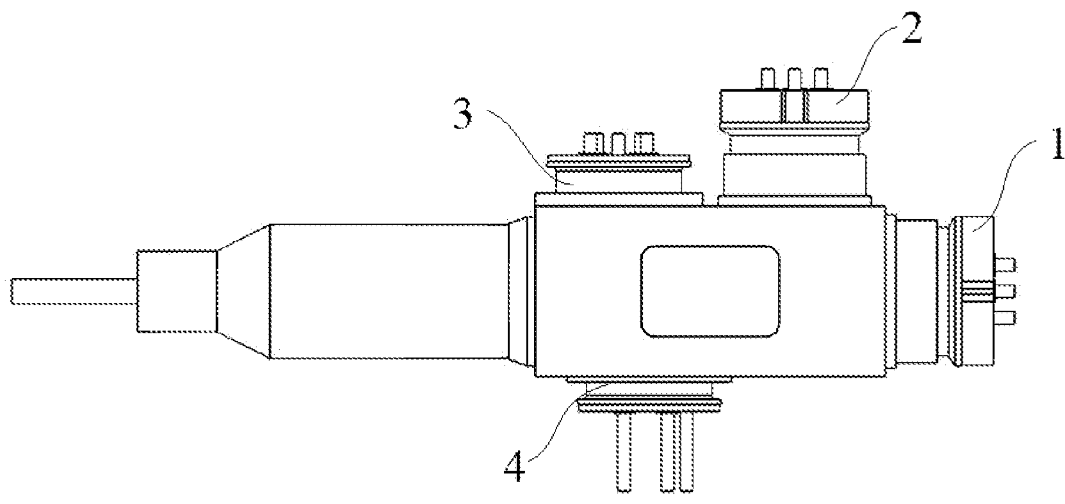
FIG. 1 is an overall structural schematic diagram of a bi-direction optical subassembly in the related art.
Figure 2:
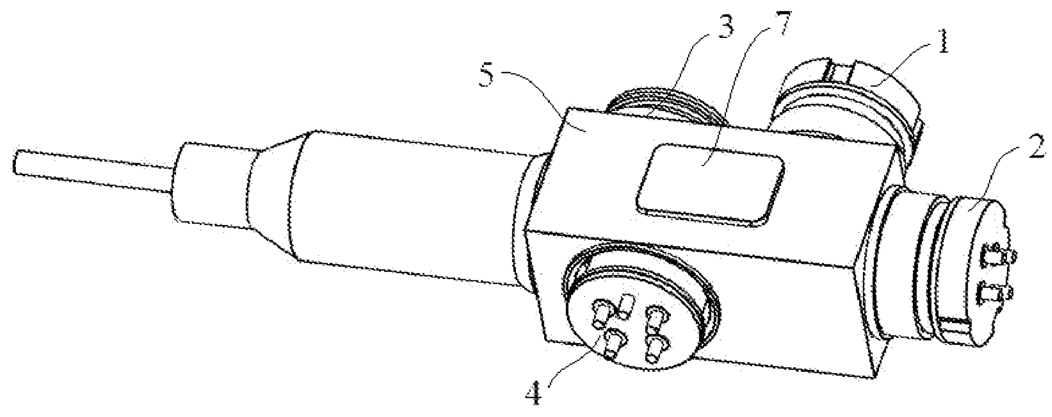
FIG. 2 is an overall structural schematic diagram of a bi-direction optical subassembly provided by an embodiment of the present disclosure.
Figure 3:
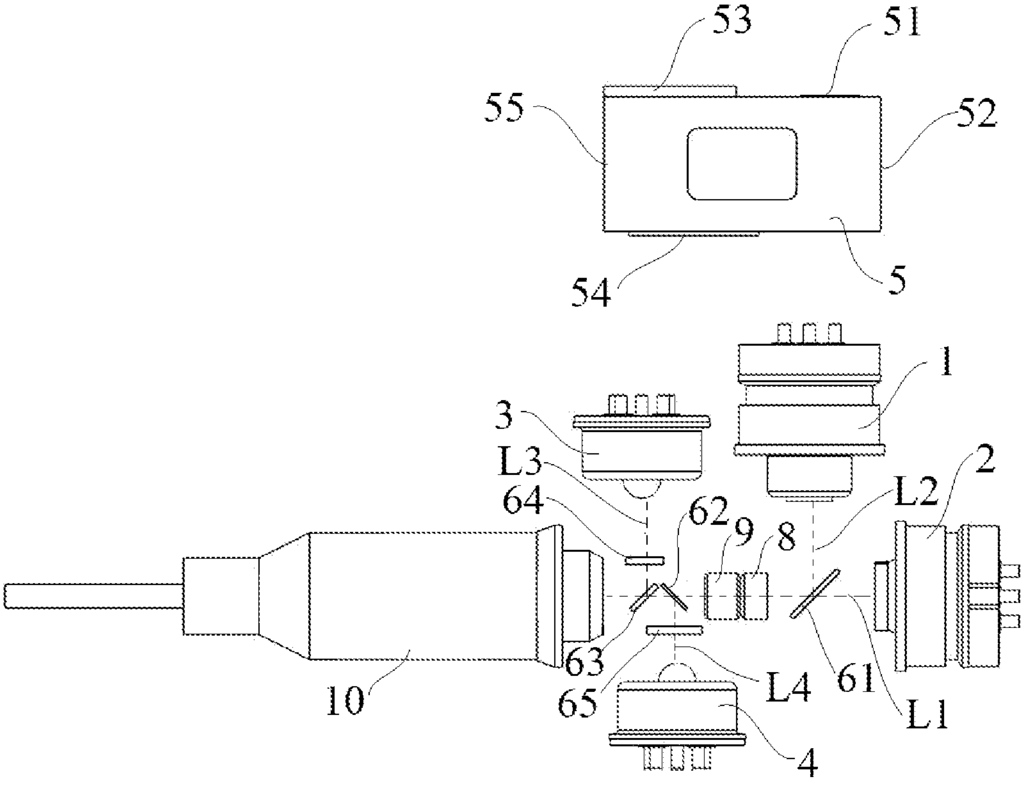
FIG. 3 is an explosion structure schematic diagram of the bi-direction optical subassembly shown in FIG. 2.

FIG. 2 shows an overall structural schematic diagram of a bi-direction optical subassembly provided by an embodiment of the present disclosure. FIG. 3 shows an explosion structure schematic diagram of the bi-direction optical subassembly shown in FIG. 2.

As shown in FIG. 2 and FIG. 3, the bi-direction optical subassembly provided by the embodiment of the present disclosure includes a first transmitter 1, a second transmitter 2, a first receiver 3, a second receiver 4, and a main body 5.

The main body 5 includes an optical transmission channel, a first optical transmission port 51, a second optical transmission port 52, a first optical reception port 53, a second optical reception port 54, and an optical fiber connection port 55. The first optical transmission port 51, the second optical transmission port 52, the first optical reception port 53, the second optical reception port 54, and the optical fiber connection port 55 are connected to the optical transmission channel.

The first transmitter 1 is encapsulated in the first optical transmission port 51, and the first transmitter 1 is configured to generate a first optical signal with a first wavelength.

The second transmitter 2 is encapsulated in the second optical transmission port 52, and the second transmitter 2 is configured to generate a second optical signal with a second wavelength. A transmission rate of the first optical signal is greater than a transmission rate of the second optical signal.

The first receiver 3 is encapsulated in the first optical reception port 53, and the first receiver 3 is configured to receive a third optical signal with a third wavelength.

The second receiver 4 is encapsulated in the second optical transmission port 52, and the second receiver 4 is configured to receive a fourth optical signal with a fourth wavelength.

In one embodiment, the first optical transmission port 51 and the first optical reception port 53 are arranged on a same side of the main body 5. The second optical transmission port 52 is arranged opposite to the optical fiber connection port 55. The second optical reception port 54 is opposite to the first optical reception port 53, and the second optical reception port 54 is staggered with the first optical reception port 53. The optical fiber connection port 55 is configured to connect an optical fiber 10. The bi-direction optical subassembly is connected to an optical fiber flange (not shown in the drawings) by the optical fiber 10.

In one embodiment, both the first transmitter 1 and the second transmitter 2 are laser diodes, which are configured to convert electrical signals into optical signals with corresponding wavelengths for output. In one embodiment, the transmission rate of the first wavelength of the first optical signal generated by the first transmitter 1 is greater than the transmission rate of the second wavelength of the second optical signal generated by the second transmitter 2.

In one embodiment, the first transmitter 1 and the first receiver 3 are XGS/XG-PON optical transceivers. The second transmitter 2 and the second receiver 4 are GPON optical transceivers. Both the XG-PON and the XGS-PON belong to GPON series. From a technical point of view, the XGS-PON is a technical evolution of the XG-PON. Both the XG-PON and the XGS-PON are 10 G PONs, and the main difference is: the XG-PON is an asymmetric PON, and the XGS-PON is a symmetric PON.

The main PON technologies currently used are the GPON and the XG-PON. Both the GPON and the XG-PON are asymmetric PONs. Since user's uplink/downlink data is generally asymmetrical, taking a certain first-tier city as an example, in an uplink traffic of the OLT, an average uplink traffic of the OLT is only 22% of a downlink traffic, so technical characteristics of the asymmetric PON basically match user's needs. More importantly, an uplink rate of the asymmetric PON is low, and a cost of sending subassembly, such as lasers, in ONU is low, and a price of corresponding equipment is low.

In one embodiment, the optical transceiver component is a four-port device integrated with the XG-PON and the GPON, wherein the uplink rate of the PON port of XG-PON is 2.5 G, and the downlink rate is 10 G. Correspondingly, the uplink rate of the PON port of GPON is 1.25 G, and the downlink rate is 2.5 G.

In one embodiment, the bi-direction optical subassembly is a four-port device integrated with the XGS-PON and the GPON. In one embodiment, an uplink rate and a downlink rate of a PON port of the XGS-PON are both 10 G. Correspondingly, an uplink rate of the GPON is 1.25 G, and a downlink rate of the GPON is 2.5 G. In another embodiment, the uplink rate and the downlink rate of the PON port of the XGS-PON are both 25 G, and correspondingly, the uplink rate of the GPON is 10 G. In another embodiment, the uplink rate and the downlink rate of the PON port of the XGS-PON are both 50 G, correspondingly, the uplink rate of the GPON is 10 G.

In one embodiment of the present disclosure, the bi-direction optical subassembly integrates functions of the XGS/XG-PON and the GPON into the main body 5 to form the four-port device. In one embodiment, the first optical transmission port 51 and the first optical reception port 53 of the main body 5 are arranged on a same side of the main body 5, so that the first transmitter 1 and the first receiver 3 are arranged on the same side of the main body 5, and the first transmitter 1 and the first receiver 3 can share a flexible circuit board. The second optical transmission port 52 is arranged opposite to the optical fiber connection port 55, so that the second transmitter 2 is arranged opposite to the optical fiber connection port 55. The second optical reception port 54 is opposite to the first optical reception port 53, and the second optical reception port 54 and the first optical reception port 53 are arranged in a staggered manner, so that the second receiver 4 is opposite to the first receiver 3, and the second receiver 4 and the first receiver 3 are arranged in the staggered manner. By optimizing a structural layout of the bi-direction optical subassembly, a number of flexible circuit boards are reduced, therefore simplifying a wiring process of high-speed chip drive circuits and reducing manufacturing costs.

In one embodiment of the present disclosure, the bi-direction optical subassembly includes the main body 5 and the main body 5 defines the first transmitter 1, the second transmitter 2, the first receiver 3 and the second receiver 4. A transmission rate of the first optical signal generated by the first transmitter 1 is greater than a transmission rate of the second optical signal generated by the second transmitter 2. By arranging the first transmitter 1 and the first receiver 3 on the same side of the main body 5, the first transmitter 1 and the first receiver 3 can share one flexible circuit board. Simultaneously, the second transmitter 2 is arranged opposite to the optical fiber connection port 55, and the second receiver 4 is arranged opposite to the first receiver 2 and the second receiver 4 is staggered with the first receiver 2, so that a structural layout can be optimized. Compared with a cross arrangement of the first transmitter 1 and the first receiver 3 or the second transmitter 2 and the second receiver 4 in the related art, the number of flexible circuit boards can be greatly reduced, the wiring process of the high-speed chip driving circuit can be simplified, and an overall cost is reduced, a product performance is improved.

In one embodiment, the first wavelength of the first optical signal generated by the first transmitter 1 is 1270 nm, the second wavelength of the second optical signal generated by the second transmitter 2 is 1310 nm, and the third wavelength of the third optical signal received by the first receiver 3 is 1577 nm, and the fourth wavelength of the fourth optical signal received by the second receiver 4 is 1490 nm.

In one embodiment, the optical transmission channel includes a first optical channel L1, a second optical channel L2, a third optical channel L3 and a fourth optical channel L4. The first optical channel LI is connected between the second transmitter 2 and the optical fiber connection port 55. The second optical channel L2 is connected between the first transmitter 1 and the first optical channel L1 Channel L2. The third optical channel L3 is connected between the first receiver 3 and the first optical channel L1. The fourth optical channel L4 is connected between the second receiver 4 and the first optical channel L1.

Further, the bi-direction optical subassembly also includes a first filter 61, a second filter 62, a third filter 63, a fourth filter 64 and a fifth filter 65. The first filter 61 is arranged at an intersection between the first optical channel L1 and the second optical channel L2. The second filter 62 is arranged at an intersection between the first optical channel L1 and the fourth optical channel L4, the third filter 63 is arranged at an intersection between the first optical channel L1 and the third optical channel L3, and the second filter 62 is perpendicular to the third filter 63. The fourth filter 64 is arranged at the third optical channel L3, and the fifth filter 65 is arranged at the fourth optical channel L4, and a position of the fifth filter 65 is opposite to positions of the second filter 62 and the third filter 63.

In one embodiment, an included angle between a normal of the first filter 61 and an optical axis of the first optical channel L1, an included angle between a normal of the second filter 62 and the optical axis of the first optical channel L1, and an included angle between a normal of the third filter 63 and the optical axis of the first optical channel L1 are all 45°, therefore realizing the transmission and the reflection of different wavelengths, effectively separating transmission wavelength signals or reflection wavelength signals. In one embodiment, an included angle between a normal of the fourth filter 64 and an optical axis of the third optical channel L3 is 0°, and an included angle between a normal of the fifth filter 65 and an optical axis of the fourth optical channel L4 is 0°.

In one embodiment, the first optical signal of the first wavelength generated by the first transmitter 1 during operation is directly transmitted by the first filter 61 and then transmitted to the optical fiber connection port 55 along the first optical channel L1.

The second optical signal of the second wavelength generated by the second transmitter 2 during operation is transmitted along the second optical channel L2, after passing through the first filter 61, the second optical signal is reflected to the first optical channel L1 and transmitted toward the optical fiber connection port 55.

When the first receiver 3 is in operation, the third optical signal with the third wavelength is transmitted from the optical fiber connection port 55 to the third filter 63 along the first optical channel L1, and reflected to the fourth filter 64 of the third optical channel L3, and then transmitted through the fourth filter 64, and finally received by the first receiver 3. In one embodiment, the fourth filter 64 is configured to filter out possible other stray light reflected from the third filter 63.

When the second receiver 4 is in operation, the fourth optical signal with the fourth wavelength is transmitted from the optical fiber connection port 55 along the first optical channel L1 to the third filter 63, and passes through the second filter 62 after being transmitted from the third filter 63. The fourth optical signal is then reflected to the fourth optical channel L4, and transmitted by the fifth filter 65, and finally received by the second receiver 4. In one embodiment, the fifth filter 65 is configured to filter other possible stray light from the third filter 63 and the second filter 62.

In one embodiment, the bi-direction optical subassembly further includes a base part 7, an isolator 9, and a lens 8. The base part 7 is embedded in the main body 5. The lens 8 and the isolator 9 are sequentially arranged between the first filter 61 and the third filter 63 in the first optical channel L1, and the lens 8 and the isolator 9 are respectively connected to the base part 7. The lens 8 is configured to collimate an emission beam transmitted from the first filter 61, and the isolator 9 is configured to transmit the emission beam transmitted from the lens 8, to reduce an impact of reflected light on the performance of the first transmitter 1 and the second transmitter 2 in the network.

In one embodiment, after the first optical signal generated by the first transmitter 1 and the second optical signal generated by the second transmitter 2 passing through the first filter 61 respectively, the first optical signal and the second optical signal directly pass through the lens 8, the isolator 9, the second filter 62, the third filter 63 along the first optical channel L1, and finally the first optical signal and the second optical signal are transmitted from the optical fiber connection port 55 to the optical fiber.

Due to a low uplink rate of the asymmetric PON, the cost of the sending subassembly is low, and the price of corresponding equipment is low. However, user's needs are diverse. With a rise of services, such as live broadcast and video surveillance, there are more and more scenarios where users pay more attention to an uplink bandwidth. Furthermore, an inbound dedicated line needs to provide uplink/downlink symmetrical circuits. The above services boost demands for the XGS-PON.

In one embodiment, the transmission rate of the first optical signal generated by the first transmitter 1 is equal to the transmission rate of the third optical signal received by the first receiver 3. At this time, the bi-direction optical subassembly is a four-port device integrated with the XGS-PON and the GPON. In one embodiment, the XGS-PON is the symmetrical PON.

The downlinks of the XGS-PON and the XG-PON adopt a broadcast method, and the uplinks of the XGS-PON and the XG-PON adopt a time division multiple access (TDMA) method. Since the downlink wavelength and the downlink rate of the XGS-PON and the XG-PON are same, a downlink of the XGS-PON does not distinguish the XGS-PON ONU and the XG-PON ONU. An optical splitter broadcasts a downlink optical signal to a same ODN link, each XG(S)-PON (XG-PON and XGS-PON) ONU chooses to receive its own signal, and discards other signals.

An uplink of the XGS-PON performs a data transmission according to time slots, and the ONU sends data in the time slots permitted by the OLT. The OLT dynamically allocates the time slots according to the traffic demands of different ONUs and types of the ONUs. In one time slot allocated to the XG-PON ONU, the data transmission rate is 2.5 Gbps. In one time slot allocated to the XGS-PON ONU, the data transmission rate is 10 Gbps. It can be seen that the XGS-PON naturally supports a mixed access with the XG-PON ONUs and the XGS-PON.

Since the uplink/downlink wavelength is different from that of the GPON, the XGS-PON uses a combo solution to share the ODN with the GPON. The combo optical module of the XGS-PON integrates an optical module of the GPON, an optical module of the XGS-PON, and a multiplexer of the WDM. In the uplink, after the optical signal enters a combo port of the XGS-PON, the WDM filters a GPON signal and an XGS-PON signal according to a wavelength, and then sends the optical signal to different channels. In the downlink, the signals from a GPON channel and an XGS-PON channel are multiplexed by the WDM, and a mixed signal is downlinked to the ONU by the ODN. Since the wavelengths of signals are different, different types of the ONUs select their own required wavelengths to receive signals by internal filters.

Since the XGS-PON naturally supports a coexistence with the XG-PON, the combo solution of the XGS-PON supports a mixed access of three types of ONUs. The three types of ONUs include the GPON, the XG-PON and the XGS-PON. That is, the number of the first transmitter 1 and the first receiver 3 is two, and the number of the second transmitter 2 and the second receiver 4 is one. The combo optical module of the XGS-PON is also called three-mode combo optical module. The combo optical module of the XG-PON is called two-mode combo optical module because the combo optical module of the XG-PON supports the mixed access of the GPON ONUs and the XG-PON.

Affected by an equipment cost and an equipment maturity, currently, an equipment price of the XGS-PON is generally much higher than that of the XG-PON. A unit price of the OLT (including a combo user board) is about 20% higher, and a unit price of the ONU is more than 50% higher. Although inbound dedicated lines need to provide uplink/downlink symmetrical circuits, the actual traffic of most inbound dedicated lines is still dominated by the downlink. Although there are more and more scenarios where users pay more attention to the uplink bandwidth, there are almost no services that cannot be accessed by the XG-PON but must be accessed by the XGS-PON.

Due to good compatibility of the combo solution of the XGS-PON, the unit price of the XGS-PON OLT (including the combo user board) is not much higher than that of the XG-PON. A small amount of the XGS-PON OLT equipment can be deployed in first-tier cities, second-tier cities and provincial capitals (headquarter uplink traffic of the inbound dedicated line is usually high), and the XGS-PON ONU is equipped according to user's actual uplink bandwidth requirements.

Figure 4:
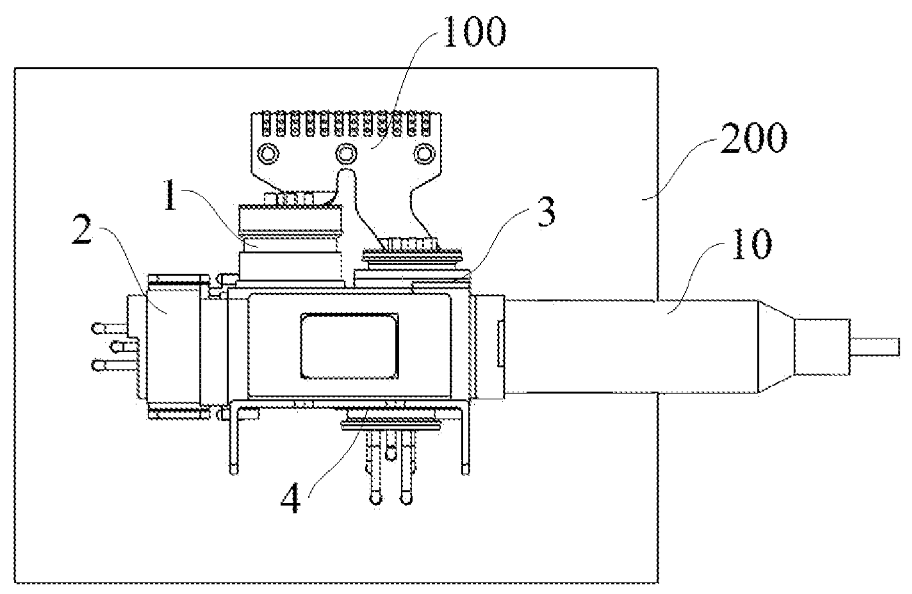
FIG. 4 is a schematic structural diagram of a combo optical module provided by an embodiment of the present disclosure.
Figure 5:
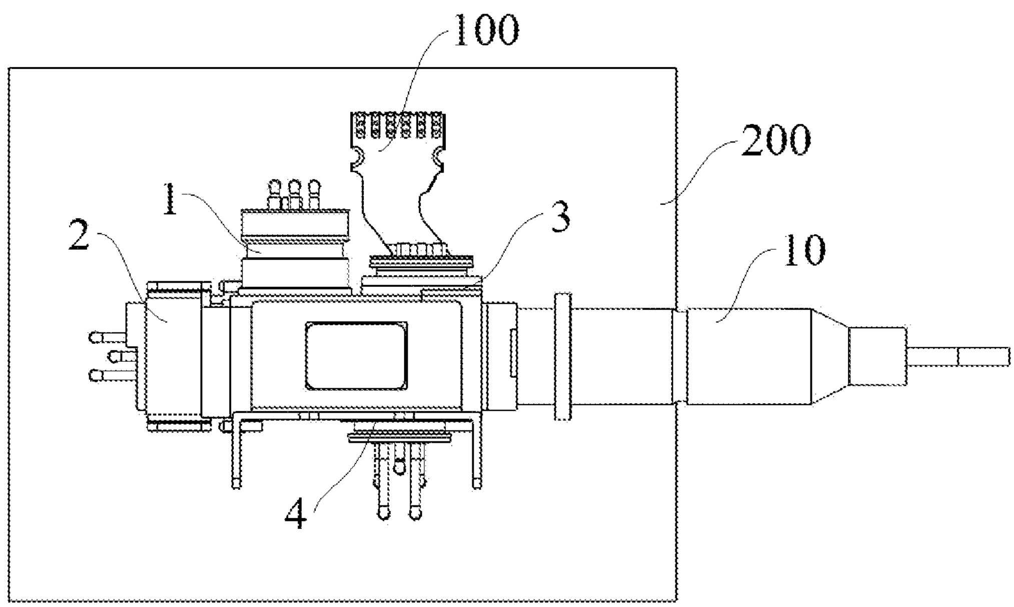
FIG. 5 is a schematic structural diagram of a combo optical module provided by another embodiment of the present disclosure.

FIG. 4 shows a schematic structural diagram of a combo optical module provided by an embodiment of the present disclosure. FIG. 5 shows a schematic structural diagram of a combo optical module provided by another embodiment of the present disclosure.

As shown in FIG. 4 and FIG. 5, one embodiment of the present disclosure provides a combined optical module (Combo ONU). The Combo ONU includes a housing (not shown in the drawings), any bi-direction optical subassembly as described above and a circuit board. The bi-direction optical subassembly and the circuit board are arranged in the housing, and the bi-direction optical subassembly is electrically connected to the circuit board.

The circuit board is generally a rigid printed circuit board (PCB). Due to its relatively hard material, the rigid printed circuit board can also realize a bearing function. For example, the rigid printed circuit board can carry a chip smoothly. When the bi-direction optical subassembly is arranged on the board, the rigid printed circuit board can also provide a stable load. The rigid printed circuit board can also be inserted into an electrical connector in an upper computer cage. In one embodiment, metal pins/golden fingers are formed on a surface of one end of the rigid printed circuit board for connection with the electrical connector. All of these are not convenient for flexible circuit boards to implement.

The flexible circuit boards are also used in some bi-direction optical subassemblies as a supplement to the rigid printed circuit boards. The flexible circuit boards are generally used in conjunction with the rigid printed circuit boards. For example, a flexible circuit board can be configured to connect the rigid printed circuit board and the transmitter of the bi-direction optical subassembly.

One of core links of an optical fiber communication is a conversion of photoelectric signals. The optical fiber communication uses information-carrying optical signals transmitted in optical fibers/optical waveguides. A low-cost, a low-loss information transmission can be achieved by using the passive transmission characteristics of a light in the optical fibers. However, an information processing equipment, such as a computer uses electrical signals, which requires a mutual conversion between the electrical signals and the optical signals during a signal transmission.

In order to ensure a transmission quality of signals, related industries usually connect a receiving end and a transmitting end of the bi-direction optical subassembly to the PCB of the ONU by a flexible circuit board. In this way, to a certain extent, in a process of signal transmission, a serious impedance mismatch caused by a long bare pin of the bi-direction optical subassembly leaking in the air, resulting in signal distortion and other problems, can be avoided. However, in the related art, the first transmitter 1 and the first receiver 3 are arranged crosswise, or the second transmitter 2 and the second receiver 4 are arranged crosswise, a connection circuit path between the bi-direction optical subassembly and a driver chip of the bi-direction optical subassembly become longer, and three or four flexible circuit boards are needed to complete the connection circuit path, a size of the flexible circuit board increases, a corresponding production cost increases, thus not only making a circuit and an assembly process of the bi-direction optical subassembly complicated, but also increasing a signal loss and an electromagnetic interference, and having a poorer high frequency performance.

In one embodiment, the first transmitter 1 and the first receiver 3 of the bi-direction optical subassembly are arranged on the same side of the main body 5, and the first transmitter 1 and the first receiver 3 can be electrically connected to the same flexible circuit board 100. Compared with a cross arrangement of the first transmitter 1 and the first receiver 3 or the second transmitter 2 and the second receiver 4 in the related art, the number of flexible circuit boards can be greatly reduced, the wiring process of the high-speed chip driving circuit can be simplified, and the manufacturing cost can be reduced.

In one embodiment, two installation ways for the bi-direction optical subassembly and the circuit board of the Combo ONU include a horizontal plug-in installation way and a direct plug-in installation way. The following part respectively takes a four-port device integrated with the XGS-PON and the GPON as the bi-direction optical subassembly, and takes a four-port device integrated with the XG-PON and the GPON as the bi-direction optical subassembly to illustrate the bi-direction optical subassembly.

When the bi-direction optical subassembly is the four-port device integrating the XGS-PON and the GPON, the transmission rate of the first optical signal generated by the first transmitter 1 is equal to the transmission rate of the third optical signal received by the first receiver 3. The circuit board includes a rigid printed circuit board 200 and a flexible circuit board 100, and the horizontal plug-in installation way is described as follows: as shown in FIG. 4, the first receiver 3 and the first transmitter 1 (XGS-PON) are electrically connected to the rigid printed circuit board 200 by the flexible circuit board 100, the second transmitter 2 and the second receiver 4 (GPON) are respectively electrically connected to the rigid printed circuit board 200 by bent pins, a total of one rigid printed circuit board 200 and one flexible circuit board 100 are needed. In this way, since the first transmitter 1 and the first receiver 3 are arranged on a same side as the high-frequency devices, the first transmitter 1 and the first receiver 3 can be electrically connected to the rigid printed circuit board 200 by one flexible circuit board 100, which greatly reduces the number of flexible circuit boards 100. Moreover, a length of the flexible circuit board 100 will be relatively short, which can highlight the high-frequency performance.

The direct plug-in installation way is described as follows: the first receiver 3 (XGS-PON) is electrically connected to the rigid printed circuit board 200 by the flexible circuit board 100, and the first transmitter 1 (XGS-PON), the second transmitter 2 and the second receiver 4 (GPON) are respectively electrically connected to the rigid printed circuit board 200 by straight pins. In this way, the flexible printed circuit board 100 will be designed to be longer, and a use of the direct plug-in installation way can make the Combo ONU fully compatible with an original GPON optical modem design, therefore improving compatibility. The number of the rigid printed circuit boards 200 can be multiple, and each of the rigid printed circuit boards 200 defines a corresponding driver chip. For example, the rigid printed circuit board 200 includes a first circuit board, a second circuit board and a third circuit board. The first receiver 3 (XGS-PON) is electrically connected to the first circuit board by the flexible circuit board 100, and the first transmitter 1 (XGS-PON) is electrically connected to the first circuit board by the straight pins. The second transmitter 2 is electrically connected to the second circuit board by the straight pins, and the second receiver 4 (GPON) is electrically connected to the third circuit board by the straight pins. A total of three rigid printed circuit boards 200 and one flexible circuit board 100 are required.

When the bi-direction optical subassembly is the four-port device integrated with the XG-PON and the GPON, the transmission rate of the first optical signal generated by the first transmitter 1 is not equal to the transmission rate of the third optical signal received by the first receiver 3. The circuit board includes the rigid printed circuit board 200 and the flexible circuit board 100, and the horizontal plug-in installation way is described as follows: as shown in FIG. 5, the first receiver 3 (XGS-PON) is electrically connected to the rigid printed circuit board 200 by the flexible circuit board 100, the first transmitter 1 (XGS-PON), the second transmitter 2, and the second receiver 4 (GPON) are electrically connected to the rigid printed circuit board 200 by the bent pins respectively. A total of one rigid printed circuit board 200 and one flexible circuit board 100 are required. In this way, since the first transmitter 1 and the first receiver 3 are arranged on a same side as the high-frequency devices, the first transmitter 1 is electrically connected to the rigid printed circuit board 200 by the bent pins, and the first receiver 3 is electrically connected to a same rigid printed circuit board 200 by one flexible circuit board 100, therefore greatly reducing the number of flexible circuit boards 100. Moreover, a length of the flexible circuit board 100 will be relatively short, which can highlight the high-frequency performance.

The direct plug-in installation way is described as follows: the first receiver 3 (XGS-PON) is electrically connected to the first rigid printed circuit board 200 by the flexible circuit board 100, and the first transmitter 1 (XGS-PON) is electrically connected to the rigid printed circuit board 200 on a same side by the bent pins; the second transmitter 2 and the second receiver 4 (GPON) are respectively electrically connected to the rigid printed circuit board 200 by the straight pins. In this way, the flexible printed circuit board 100 will be designed to be longer, and the use of the direct plug-in installation way can make the Combo ONU fully compatible with the original GPON optical modem design, therefore improving compatibility. The number of the rigid printed circuit boards 200 can be multiple, and each of the rigid printed circuit boards 200 defines a corresponding driver chip. For example, the rigid printed circuit board 200 includes a first circuit board, a second circuit board and a third circuit board. The first receiver 3 (XGS-PON) is electrically connected to the first circuit board by the flexible circuit board 100, and the first transmitter 1 (XGS-PON) is electrically connected to the first circuit board by the straight pins. The second transmitter 2 is electrically connected to the second circuit board by the straight pins, and the second receiver 4 (GPON) is electrically connected to the third circuit board by the straight pins. A total of three rigid printed circuit boards 200 and one flexible circuit board 100 are required.

It should be noted that the Combo ONU provided by the embodiment of the present disclosure can be compatible with a GPON system and an XGPON system, or compatible with the XGPON system and time-and a wavelength-division multiplexing (TWDM) PON system, or compatible with the GPON system and a 25-gigabit per second PON (25 G-PON) system, or a: 50-gigabit per second EPON (50 G-EPON), etc. Correspondingly, the number of WDM devices arranged inside the bi-direction optical subassembly can be reduced, an overall optical path for an optical signal transmission in the bi-direction optical subassembly can be shortened, and an overall size of the bi-direction optical subassembly can be made smaller.

In addition, the embodiment of the present disclosure also provides an optical network device. The optical network device includes the above-mentioned Combo ONU.

In one embodiment, optical network device further includes an optical line terminal (OLT) or an optical network unit (ONU).

In one embodiment, the above-mentioned Combo ONU is arranged in a chassis to form the optical network device. The optical network device can be the OLT, the ONU, or an optical transmission device in an optical transport network (OTN), which is not limited here.

It should be noted that references in the specification to "one embodiment," "an embodiment," "exemplary embodiment," "some embodiments," mean that the described embodiments may include particular features, structures, or characteristics, but not necessarily each embodiment includes the particular features, the structures or the characteristics. Furthermore, such phrases are not necessarily referring to the same embodiment. Furthermore, where the particular features, the structures, or the characteristics are described in conjunction with an embodiment, it is within a purview of those skilled in the art to implement such features, structures, or characteristic sin conjunction with other embodiments that are explicitly or not explicitly described.

It should be readily understood that "on", "above", and "over" in present disclosure should be interpreted in the broadest manner, such that "on" means not only "directly on something", also includes a meaning of "on something" with intermediate features or layers. And "above" or "on" includes not only the meaning of "above" or "over" but also "above" or "on" without intermediate features or layers (i.e., directly on top of something).

It should be noted that in present disclosure, relative terms such as "first" and "second" are only configured to distinguish one entity or operation from another entity or operation, without necessarily requiring or implying any such actual relationship or order between these entities or operations. Furthermore, the term "comprises", "comprises" or any other variation thereof is intended to cover a non-exclusive inclusion such that a process, method, article or apparatus comprising a set of elements includes not only those elements, but also includes elements not expressly listed. other elements of or also include elements inherent in such a process, method, article, or device. Furthermore, the term "comprises", "comprises" or any other variation is intended to cover a non-exclusive inclusion such that a process, a method, an article or a device including a set of elements includes not only those elements, but also includes elements not expressly listed, or also include elements inherent in such process, method, article, or device. Without further limitations, an element defined by a phrase "comprising a . . . " does not exclude a presence of additional identical elements in the process, method, article or device comprising said element.

Finally, it should be noted that the above embodiments are only configured to illustrate the technical solutions of the present disclosure, rather than to limit them. Although the present disclosure has been described in detail with reference to the foregoing embodiments, those skilled in the art should understand that they can still modify the technical solutions described in the foregoing embodiments, or perform equivalent replacements for some or all of the technical features. These modifications or replacements do not make an essence of the corresponding technical solutions depart from a scope of the technical solutions of the various embodiments of the present disclosure.

What is claimed is:

1. A bi-direction optical subassembly, comprising:

a main body, comprising an optical transmission channel, a first optical transmission port, a second optical transmission port, a first optical reception port, a second optical reception port, and an optical fiber connection port, wherein the first optical transmission port, the second optical transmission port, the first optical reception port, the second optical reception port, and the optical fiber connection port are connected to the optical transmission channel;

a first transmitter, encapsulated in the first optical transmission port, and configured to generate a first optical signal with a first wavelength;

a second transmitter, encapsulated in the second optical transmission port, and configured to generate a second optical signal with a second wavelength, wherein a transmission rate of the first optical signal is greater than a transmission rate of the second optical signal;

a first receiver, encapsulated in the first optical reception port, and configured to receive a third optical signal with a third wavelength;

a second receiver, encapsulated in the second optical transmission port, and configured to receive a fourth optical signal with a fourth wavelength;

wherein the first optical transmission port and the first optical reception port are arranged on a same side of the main body, the second optical transmission port is arranged opposite to the optical fiber connection port, the second optical reception port is opposite to the first optical reception port, and the second optical reception port is staggered with the first optical reception port;

wherein the optical transmission channel comprises a first optical channel connected between the second transmitter and the optical fiber connection port, a second optical channel connected between the first transmitter and the first optical channel, a third optical channel connected between the first receiver and the first optical channel, and a fourth optical channel connected between the second receiver and the first optical channel;

the bi-direction optical subassembly further comprises a first filter, a second filter, a third filter, a fourth filter, and a fifth filter, the first filter is arranged at an intersection between the first optical channel and the second optical channel; the second filter is arranged at an intersection between the first optical channel and the fourth optical channel, the third filter is arranged at an intersection between the first optical channel and the third optical channel, and the second filter is perpendicular to the third filter; the fourth filter is arranged at the third optical channel, and the fifth filter is arranged at the fourth optical channel, and a position of the fifth filter is opposite to positions of the second filter and the third filter;

wherein an included angle between a normal of the first filter and an optical axis of the first optical channel, an included angle between a normal of the second filter and the optical axis of the first optical channel, and an included angle between a normal of the third filter and the optical axis of the first optical channel are 45°; an included angle between a normal of the fourth filter and an optical axis of the third optical channel is 0°, and an included angle between a normal of the fifth filter and an optical axis of the fourth optical channel is 0°;

wherein the bi-direction optical subassembly further comprises a base part, an isolator, and a lens, the base part is embedded in the main body, the lens and the isolator are sequentially arranged between the first filter and the third filter in the first optical channel, and the lens and the isolator are respectively connected to the base part, the lens is configured to collimate an emission beam transmitted from the first filter, and the isolator is configured to transmit the emission beam transmitted from the lens.

2. The bi-direction optical subassembly as recited in claim 1, wherein the first wavelength is 1270 nm, the second wavelength is 1310 nm, the third wavelength is 1577 nm, and the fourth wavelength is 1490 nm.

3. A combo optical module, comprising:

a housing;

a bi-direction optical subassembly; and a circuit board;

wherein the bi-direction optical subassembly is arranged in the housing and comprises a main body, a first transmitter, a second transmitter, a first receiver, and a second receiver; the main body comprises an optical transmission channel, a first optical transmission port, a second optical transmission port, a first optical reception port, a second optical reception port, and an optical fiber connection port; the first optical transmission port, the second optical transmission port, the first optical reception port, the second optical reception port, and the optical fiber connection port are connected to the optical transmission channel;

the first transmitter is encapsulated in the first optical transmission port, and configured to generate a first optical signal with a first wavelength;

the second transmitter is encapsulated in the second optical transmission port, and configured to generate a second optical signal with a second wavelength, wherein a transmission rate of the first optical signal is greater than a transmission rate of the second optical signal;

the first receiver is encapsulated in the first optical reception port, and configured to receive a third optical signal with a third wavelength;

the second receiver is encapsulated in the second optical transmission port, and configured to receive a fourth optical signal with a fourth wavelength;

the first optical transmission port and the first optical reception port are arranged on a same side of the main body, the second optical transmission port is arranged opposite to the optical fiber connection port, the second optical reception port is opposite to the first optical reception port, and the second optical reception port is staggered with the first optical reception port; and the circuit board is arranged in the housing, and the bi-direction optical subassembly is electrically connected to the circuit board;

wherein the optical transmission channel comprises a first optical channel connected between the second transmitter and the optical fiber connection port, a second optical channel connected between the first transmitter and the first optical channel, a third optical channel connected between the first receiver and the first optical channel, and a fourth optical channel connected between the second receiver and the first optical channel;

the bi-direction optical subassembly further comprises a first filter, a second filter, a third filter, a fourth filter and a fifth filter, the first filter is arranged at an intersection between the first optical channel and the second optical channel; the second filter is arranged at an intersection between the first optical channel and the fourth optical channel, the third filter is arranged at an intersection between the first optical channel and the third optical channel, and the second filter is perpendicular to the third filter; the fourth filter is arranged at the third optical channel, and the fifth filter is arranged at the fourth optical channel, and a position of the fifth filter is opposite to positions of the second filter and the third filter;

wherein an included angle between a normal of the first filter and an optical axis of the first optical channel, an included angle between a normal of the second filter and the optical axis of the first optical channel, and an included angle between a normal of the third filter and the optical axis of the first optical channel are 45°; an included angle between a normal of the fourth filter and an optical axis of the third optical channel is 0°, and an included angle between a normal of the fifth filter and an optical axis of the fourth optical channel is 0°;

wherein the bi-direction optical subassembly further comprises a base part, an isolator and a lens, the base part is embedded in the main body, the lens and the isolator are sequentially arranged between the first filter and the third filter in the first optical channel, and the lens and the isolator are respectively connected to the base part, the lens is configured to collimate an emission beam transmitted from the first filter, and the isolator is configured to transmit the emission beam transmitted from the lens.

4. The combo optical module as recited in claim 3, wherein the first wavelength is 1270 nm, the second wavelength is 1310 nm, the third wavelength is 1577 nm, and the fourth wavelength is 1490 nm.

5. The combo optical module as recited in claim 3, wherein, the circuit board comprises a rigid printed circuit board and a flexible circuit board, the first receiver and the first transmitter are electrically connected to the rigid printed circuit board by the flexible circuit board, the second transmitter and the second receiver are respectively electrically connected to the rigid printed circuit board by bent pins; or the first receiver is electrically connected to the rigid printed circuit board by the flexible circuit board; and the first transmitter, the second transmitter, and the second receiver are respectively electrically connected to the rigid printed circuit board by the bent pins.

6. The combo optical module as recited in claim 3, wherein, the circuit board comprises a rigid printed circuit board and a flexible circuit board, the first receiver is electrically connected to the rigid printed circuit board by the flexible circuit board; the first transmitter, the second transmitter, and the second receiver are electrically connected to the rigid printed circuit board by straight pins respectively; or the first transmitter is electrically connected to the rigid printed circuit board by bent pins; the second transmitter and the second receiver are electrically connected to the rigid printed circuit board by the straight pins respectively.

7. An optical network device comprising:

a combo optical module as recited in claim 3.

8. The combo optical module as recited in claim 7, wherein the first wavelength is 1270 nm, the second wavelength is 1310 nm, the third wavelength is 1577 nm, and the fourth wavelength is 1490 nm.

9. The optical network device as recited in claim 7, wherein, the circuit board comprises a rigid printed circuit board and a flexible circuit board, the first receiver and the first transmitter are electrically connected to the rigid printed circuit board by the flexible circuit board, the second transmitter and the second receiver are respectively electrically connected to the rigid printed circuit board by bent pins; or the first receiver is electrically connected to the rigid printed circuit board by the flexible circuit board, and the first transmitter, the second transmitter and the second receiver are respectively electrically connected to the rigid printed circuit board by the bent pins.

10. The optical network device as recited in claim 7, wherein, the circuit board comprises a rigid printed circuit board and a flexible circuit board, the first receiver is electrically connected to the rigid printed circuit board by the flexible circuit board, the first transmitter, the second transmitter and the second receiver are electrically connected to the rigid printed circuit board by straight pins respectively; or the first transmitter is electrically connected to the rigid printed circuit board by bent pins; the second transmitter and the second receiver are electrically connected to the rigid printed circuit board by the straight pins respectively.

11. The optical network device as recited in claim 7, wherein the optical network device further comprises an optical line terminal (OLT) or an optical network unit (ONU).

* * * * *